Reissued Feb. 7, 1950

Re. 23,195

UNITED STATES PATENT OFFICE 23,195

METHOD OF STERILIZING AND PRESERVING

Arno Brasch, Brooklyn, N. Y., assignor, by mesne assignments, to Electronized Chemicals Corporation, New York, N. Y., a corporation of Delaware No Drawing. Original No. 2,456,909, dated December 21, 1948, Serial No. 700,167, September 28, 1946. Application for reissue July 20, 1949, Serial No. 105,911

17 Claims. (Cl. 21—54)

Matter enclosed in heavy brackets [ ] appears in the original patent but forms no part of this reissue specification; matter printed in italics indicates the additions made by reissue

This application is a continuation-in-part of my U. S. patent applications Serial No. 442,136, filed May 7, 1942, *now abandoned* for Method for manufacturing synthetic rubber and devices therefor; Serial No. 442,137, filed May 7, 1942, now Patent No. 2,429,217 granted October 21, 1947, for Devices for treatment of matters with high speed electrons; Serial No. 442,138, filed May 7, 1942, now abandoned, for Method for treatment of matter; Serial No. 450,923, filed July 14, 1942, *now abandoned*, for Method and means for treatment of perishable substances and products so obtained; Serial No. 451,370, filed July 17, 1942, now abandoned, for Method and means for treatment of vegetative substances and products so obtained; Serial No. 487,179, filed May 15, 1943, *now abandoned*, for Process for cracking hydrocarbons by means of ultra high speed electrons; Serial No. 488,278, filed May 24, 1943, *now abandoned* for Preparation and cracking of hydrocarbons and other chemical compounds by means of ultra high speed electrons to obtain rubber starting materials; and Serial No. 575,878, filed February 2, 1945, for Sterilization of therapeutical preparations.

*My co-pending U. S. patent applications Serial No. 760,111, filed July 10, 1947, for Methods of sterilizing non-edible substances and objects; Serial No. 760,112, filed July 10, 1947, for Methods of sterilizing and stabilizing human and animal blood and derivatives thereof; and Serial No. 56,058, filed October 22, 1948, for Method of sterilizing foodstuffs and drugs by high intensity electron irradiation, disclose certain processes which are claimed in the present application.*

My present invention relates to methods of sterilizing and preserving substances [such as foodstuffs and drugs].

It is an object of my present invention to sterilize and preserve [food stuffs and drugs] *substances* without adversely affecting the same.

It is another object of my present invention to sterilize and preserve [food stuffs and drugs] *substances* which are adversely affected by heating.

A further object of my present invention consists in methods of sterilizing and preserving food stuffs without developing harmful side effects such as change of their appearance, taste and odor.

Still another object of my present invention consists in methods of sterilizing and preserving drugs without developing harmful side effects such as reduction of their therapeutical efficiency.

Still a further object of my present invention consists in method of sterilization and preservation of [food stuffs and drugs] *substances* which enable sterilization and/or preservation of the same without heating or treatment with agents which are harmful to the treated substances.

In order to attain above objects, I have first tried to irradiate food stuffs and drugs with high speed electrons of a velocity equivalent to more than 1 million volts. Although micro-organisms within the penetration range of the irradiating high speed electrons were killed, the results of such irradiations were not very satisfactory because the irradiated products showed a pronounced change in taste, odor, apearance and structure.

I have found that the side reactions causing the change in taste, odor, appearance and structure of the irradiated products, consisted mainly in creation of hydrogen peroxide, ozone and nitrous oxides, formation of mercaptans and/or sulfides, particularly from sulphur containing compounds, denaturation of the proteins present in certain foodstuffs, decarboxylation, and hydrolysis of certain irradiated substances.

I have found that the side reactions mentioned in the preceding paragraph are mainly due to the interactions of the electrons with the atmosphere surrounding the irradiated substances and the reactive compounds within these substances, to the production of heat and other related factors, and not due to the action of the high speed electrons proper.

I have also found that these side reactions can be reduced by shortening the time periods during which the [foodstuffs and drugs] *substances* are irradiated. Therefore, sterilization and preservation processes according to my present invention mainly consist in irradiating the [foodstuffs and drugs] *substances* to be sterilized with high speed electrons during one or more extremely short time period. Such reduction of the length of the single irradiation periods results in reduction or avoidance of the above listed undesired side reactions.

Furthermore, it is important to avoid creation of heat in the irradiated [foodstuffs and drugs] *substances*; this object is also attained by reducing the length of the single irradiation periods.

I have obtained very good results by using for sterilization purposes high speed electrons of a velocity equivalent to more than two preferably more than four million volts; excellent results were obtained by use of high speed electrons of a velocity equivalent to about six million volts.

The definition "high speed electrons of a velocity equivalent to" a certain voltage is intended to define high speed electrons having a velocity resulting from the development of said voltage.

Furthermore, I have found it advisable to reduce the single irradiation periods to less than $10^{-4}$, preferably to about $10^{-6}$ of a second. In some cases, it will even be indicated to use irradiation periods lasting $10^{-7}$ of a second, or less.

I wish to emphasize that the short duration of the single irradiation periods does not change the effect of such irradiations on the germs contained in the irradiated [foodstuffs or drugs] *substances*; I found that such irradiations have a sterilizing and preserving effect, i. e. destroy the germs, inasmuch as such germs need not be killed entirely during a single irradiation period, but only be vigorously attacked, such attacks, particularly if repeated during consecutive short irradiation periods, weaken the germs which will then die or at least lose their virulent character a certain time after the irradiations are actually terminated.

Thus, it is evident that the length of each of the single irradiation periods is of minor importance from the point of view of destruction of the germs, but that only the total length of the irradiation periods together decides the irradiation effect.

Therefore, in order to obtain optimal sterilization and preservation effects, I propose, in accordance with my present invention to irradiate [foodstuffs and drugs] *substances* to be sterilized and/or preserved with high speed electrons during a series of consecutive short time periods.

I may use for my new processes described above different types of devices for creating high speed electrons and also the most differently constructed and shaped irradiation chambers. However, I have found that the devices described in my U. S. Patents Nos. 2,043,733 and 2,099,327 are very well adapted and the most efficient ones for the purposes of my present invention. Thus, while any source of radiation can be used for the production of high speed electrons, my so-called condenser method which generates electric impulses of very short duration and great intensity by use of a laminated discharge tube proved most satisfactory. This method consists in using a plurality of condenser units, the number of which is selected according to the voltage required, charging these condenser units in parallel over charging resistances and discharging them by means of discharge spark gaps in series whereby the voltage is multiplied in accordance with the number of condenser units employed and in accordance with the voltage with which each of the individual condenser units has been charged.

This high voltage which is at least one million volts, preferably however three or more million volts, is conducted to the cathode of a laminated discharge tube also described in my above mentioned U. S. patents. A discharge tube of this type is adapted to create high speed electrons having the required high velocity and adapted for the sterilizing irradiation processes described above.

Although my above described sterilization and preservation processes are effective for a great variety of [foodstuffs and drugs] *substances*, it is rather difficult to obtain satisfactory results with certain products. Thus, it is not always possible, by increase of the speed of the irradiating electrons and decrease of the length of the single irradiation periods, to avoid entirely certain of the above listed side effects, namely, the creation of hydrogen peroxide, ozone and nitrous oxides, the formation of mercaptans from sulphur-containing compounds, and the denaturation of proteins contained in some foodstuffs. Furthermore, during irradiation of certain foodstuffs and drugs, additional side reactions occur, which cannot be eliminated by the increase of the velocity of the irradiating electrons and by reduction of the length of the single irradiation periods: Such unaffected side reactions are mainly the destruction of the natural coloring matters in the irradiated products, particularly the destruction of hemoglobin, chlorophylls and carotinoids present in the irradiated substances.

I have found that the side reactions listed in the preceding paragraph can be greatly reduced and in most cases completely avoided by cooling the [foodstuffs and drugs] *substances* to be sterilized and/or preserved to a low temperature and irradiating the thus cooled substances in the manner described above.

The degree of cooling depends on the character of the single products to be irradiated: Good results were already obtained by cooling to a temperature of −20° C.; the results were, however, better if the products were cooled to a temperature of −100° C., or less, and irradiated at such a low temperature.

Tests proved that by first cooling the [foodstuffs and drugs] *substances* to the low temperatures mentioned above and then subjecting the thus cooled products to a series of very short irradiations by high speed electrons, it is possible to sterilize and/or preserve foodstuffs and drugs without noticeable change in appearance, taste and odor and drugs without any reduction of their therapeutical efficiency.

Generally, I have found that the combination of the three factors mentioned above, namely high speed electron irradiation, a series of very short irradiation periods, and cooling to a low temperature, not only suppresses oxidation, but also avoids all other above discussed side effects, leaving only the most rapidly occurring chemical and biological reactions unaffected.

It should be mentioned that during irradiation of a few products, particularly drugs, with high speed electrons, certain side reactions occur which can hardly be avoided by my new processes defined above. This holds true, particularly, for products which are highly unstable to oxidation such as vitamins, hormones, vaccines, quinones and like substances. Cooling to very low temperatures and very short irradiation periods, as proposed above, are insufficient to avoid oxidation of such products during irradiation.

I have found it advisable to irradiate products of the type defined in the preceding paragraph in accordance with my present invention in the absence of oxidizing agents, e. g. in an atmosphere having an oxygen concentration which is reduced to such a degree that the amount of oxygen molecules present is insufficient to react during irradiation with the irradiated substances. Such reduction of the oxygen concentration can be attained by use of an inert gaseous atmosphere, or by use of partial vacuum.

I have found that in order to attain permanent sterilization, it is advisable to place the [foodstuffs or drugs] *substances* to be sterilized, in sealed containers, e. g. cans for foodstuffs and ampoules for drugs, and to irradiate the products while they are sealed in such cans and ampoules. Of course, as set forth above, these containers should contain only very little or no oxygen at all so as to prevent oxidation of the irradiated products.

In accordance with my present invention, sterilization and/or preservation of [food] products [and drugs] is preferably carried out in the following way:

First, the products to be sterilized are placed into a container from which the air is removed, either by introduction of an inert gas or by evacuating the container.

After the products to be sterilized are placed into the container and the air removed therefrom as described above, the container is airtightly sealed.

Thereafter, the container together with the products to be irradiated is cooled to between −20° C. and −100° C., depending upon the type of the products.

The thus cooled container and products to be irradiated are then subjected to irradiation with high speed electrons having a velocity equivalent to between three and six million volts during a series of consecutive very short time periods, each lasting between $10^{-4}$ and $10^{-6}$ of a second.

I have found that from two to eighteen short irradiation periods with high speed electrons having a velocity equivalent to four million volts are necessary to obtain satisfactory sterilization and/or preservation results.

After sterilization and/or preservation of the products as described above, the same can be stored for a practically unlimited time without spoiling.

The above described sterilization process can be employed for a great variety of [foodstuffs and drugs] *substances*. Practical sterilization tests carried out by irradiating various foodstuffs and drugs with high speed electrons of a velocity equivalent to four million volts during a series of consecutive irradiation periods, each lasting about $10^{-6}$ of a second, showed the following results:

Diphtheria anti-toxin was irradiated once in the manner set forth above and became sterile without any loss of potency.

A novocaine solution was irradiated twice and became sterile without any chemical changes.

Brewers' yeast infested with weevil eggs was irradiated three times and became sterile without any change in the yeast.

Whole bran was irradiated twice and became sterile without any change in its growth-promoting properties.

Trypsin was irradiated three times and became sterile without any inactivation.

Ground raw beef was irradiated twice in a Pliofilm bag and became sterile without any change in appearance, taste and odor.

Fluid milk was irradiated once and became sterile without any change in appearance.

Pork meat was irradiated four times and became 99.9% sterile without any change in appearance.

A potato was irradiated four times and became 93.5% sterile without any change in consistency.

I wish to note that by increasing the number of the single short irradiation periods, it is possible not only to attain sterilization of food products and drugs, but also to attain nearly permanent preservation of the same. Thus, by increasing the number of irradiation periods, it is possible, for instance, to attain enzyme inhibition without attacking the other constituents of the irradiated foodstuffs.

In general, it can be said that by increasing the number of irradiations to three to eighteen times the number of irradiations necessary for sterilization, enzyme inhibition and therefore preservation of the irradiated food products can be obtained without any noticeable change in taste, odor and appearance of the irradiated substances, particularly foodstuffs.

Practical preservation tests carried out by irradiating various foodstuffs in the same manner as described above in connection with sterilization tests, but a greater number of times, showed the following results:

Lean beef and ground pork were irradiated eight times in the manner set forth above and then stored at incubator temperature for twelve days; after such storage time they were examined and it was found that their appearance, taste and odor were substantially unchanged.

Calf's liver and chicken were irradiated six to eight times and then stored for several days; examined after such storage, they showed a fair to good appearance, taste and odor.

An oyster was irradiated six times and then stored at incubator temperature for five days and had thereafter a good appearance and odor and a fair slightly cooked taste.

Fluid milk and fluid cream were irradiated six to eight times in the manner set forth above and then stored at room temperature for six days and had thereafter an unchanged good appearance, taste and odor.

Above tests show that the new processes proposed by me are well adapted for sterilization and preservation of a great variety of foodstuffs and drugs.

It should be mentioned that some of the above described tests were carried out at low temperatures, i. e. the foodstuffs and drugs were cooled before irradiation. Some of the tests were carried out in an inert gaseous atmosphere and some were carried out in a partial vacuum. It was found that reduction of the temperature and avoidance of oxidizing substances greatly improved the sterilization and preservation effects by preventing undesired side reactions.

It will be understood that each of the elements described above, or two or more together, may also find a useful application in other types of sterilization and preservation processes differing from the types described above.

*Thus, my new sterilization processes might also be used for sterilizing human and animal whole blood and derivatives thereof as blood plasma, blood serum, lymph and blood corpuscles.*

*Furthermore, my new sterilization processes might be used for sterilizing non-edible substances and objects such as medical, surgical and cosmetic devices, instruments and implements of all kinds before use.*

*Similarly, my new sterilization processes can be employed for sterilizing materials and substances which are used for cosmetic purposes such as cosmetic applicators, various face and body powders, cosmetic lotions, various cosmetic creams and other substances used for various cosmetic purposes.*

*I have found that it is also possible to sterilize by my new processes all substances used for sur-*

*gical purposes as for instance catgut, gauze and other materials used for bandages and cotton used in the field of surgery.*

*Furthermore, good results were obtained with my new sterilization processes when the same were used for sterilizing living tissues such as animal and human bones, nerves and cornea to be transplanted.*

*I have found that my new processes can also be used for sterilizing all plant extracts used for medical purposes.*

*Non-edible objects for which my new sterilization processes can also be used are various brushes, particularly the bristles and all materials used for filling upholstered furniture, mattresses and pillows, such as down, feathers, kapok, cotton, wool, horse hair, silk and other textile materials.*

*Finally, it is also possible to sterilize with my new processes and thus preserve plants such as flowers and the like.*

*The above mentioned uses of my new processes are disclosed in my copending U. S. patent applications listed above.*

While I have described the invention as embodied in processes for sterilizing and preserving [foodstuffs and drugs] *substances,* I do not intend to be limited to the details shown, since various modifications and changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secur by Letters Patent is:

1. Method of sterilizing a substance [, such as a foodstuff or a drug,] without developing harmful side effects by bombarding the same with high speed electrons of a velocity equivalent to more than one million volts during at least one very short time period lasting less than $10^{-4}$ of a second.

2. Method of sterilizing a substance [, such as a foodstuff or a drug,] without developing harmful side effects by bombarding the same repeatedly with high speed electrons of a velocity equivalent to more than one million volts during consecutive very short time periods each lasting less than $10^{-4}$ of a second.

3. Method of sterilizing a substance [, such as a foodstuff or a drug,] without developing harmful side effects comprising the steps of cooling the same to a temperature below 0° C.; and bombarding the thus cooled substance with high speed electrons of a velocity equivalent to more than one million volts during at least one very short time period lasting less than $10^{-4}$ of a second.

4. Method of sterilizing a substance [, such as a foodstuff or a drug,] without developing harmful side effects comprising the steps of cooling the same to a temperature below 0° C.; and bombarding the thus cooled substance with high speed electrons of a velocity equivalent to more than one million volts during consecutive very short time periods each lasting less than $10^{-4}$ of a second.

5. Method of sterilizing a substance [, such as a foodstuff or a drug,] without developing harmful side effects comprising the steps of cooling the same to a temperature of below −50° C.; and bombarding the thus cooled substance with high speed electrons of a velocity equivalent to more than one million volts during at least one very short time period lasting less than $10^{-4}$ of a second.

6. Method of sterilizing a substance [, such as a foodstuff or a drug,] without developing harmful side effects by bombarding the same with high speed electrons of a velocity equivalent to more than one million volts during at least one very short time period lasting less than $10^{-4}$ of a second and excluding during such electron bombardment oxidizing agents from the bombarded substance.

7. Method of sterilizing a substance [, such as a foodstuff or a drug,] without developing harmful side effects by bombarding the same repeatedly with high speed electrons of a velocity equivalent to more than one million volts during consecutive very short time periods each lasting less than $10^{-4}$ of a second excluding during such electron bombardment oxidizing agents from the bombarded substance.

8. Method of sterilizing a substance [, such as a foodstuff or a drug,] without developing harmful side effects by bombarding the same in an inert gaseous atmosphere with high speed electrons of a velocity equivalent to more than one million volts during at least one very short time period lasting less than $10^{-4}$ of a second.

9. Method of sterilizing a substance [, such as a foodstuff or a drug,] without developing harmful side effects by bombarding the same repeatedly in a partial vacuum with high speed electrons of a velocity equivalent to more than one million volts during consecutive very short time periods each lasting less than $10^{-4}$ of a second.

10. Method of sterilizing a substance [, such as a foodstuff or a drug,] without developing harmful side effects by bombarding the same in a substantially oxygen free atmosphere with high speed electrons of a velocity equivalent to more than one million volts during at least one very short time period lasting less than $10^{-4}$ of a second.

11. Method of sterilizing a substance [, such as a foodstuff or a drug,] without developing harmful side effects comprising the steps of cooling the same to a temperature below 0° C.; and bombarding the thus cooled substance in a substantially oxygen free atmosphere with high speed electrons of a velocity equivalent to more than one million volts during at least one very short time period lasting less than $10^{-4}$ of a second.

12. Method of sterilizing a substance [, such as a foodstuff or a drug,] without developing harmful side effects comprising the steps of placing said substance into a container; air-tightly closing said container; and bombarding said substance air-tightly enclosed in said container with high speed electrons of a velocity equivalent to more than one million volts during at least one very short time period lasting less than $10^{-4}$ of a second.

13. Method of sterilizing a substance [, such as a foodstuff or a drug,] without developing harmful side effects comprising the steps of placing said substance into a container; air-tightly closing said container; and bombarding said substance air-tightly enclosed in said container with high speed electrons of a velocity equivalent to more than one million volts during consecutive very short time periods each lasting less than $10^{-4}$ of a second.

14. Method of sterilizing a substance [, such as a foodstuff or a drug,] without developing harmful side effects comprising the steps of placing said substance into a container; air-tightly closing said container; cooling said substance air-tightly enclosed in said container to a temperature below 0° C.; and bombarding said cooled substance air-tightly enclosed in said container with high speed electrons of a velocity equivalent to more than one million volts during at least one very short time period lasting less than $10^{-4}$ of a second.

15. Method of sterilizing a substance [, such as a foodstuff or a drug,] without developing harmful side effects comprising the steps of placing said substance into a container; air-tightly closing said container; cooling said substance air-tightly enclosed in said container to a temperature below 0° C.; and bombarding said cooled substance air-tightly enclosed in said container with high speed electrons of a velocity equivalent to more than one million volts during consecutive very short time periods lasting less than $10^{-4}$ of a second.

16. Method of sterilizing a substance [, such as a foodstuff or a drug,] without developing harmful side effects comprising the steps of placing said substance into a container; removing air contained in said container; air-tightly closing said container; and bombarding said substance air-tightly enclosed in said container with high speed electrons of a velocity equivalent to more than million volts during at least one very short time period lasting less than $10^{-4}$ of a second.

17. Method of sterilizing a substance [, such as a foodstuff or a drug,] without developing harmful side effects comprising the steps of placing said substance into a container; removing air contained in said container; air-tightly closing said container; and bombarding said substance air-tightly enclosed in said container with high speed electrons of a velocity equivalent to more than one million volts during consecutive very short time periods each lasting less than $10^{-4}$ of a second.

ARNO BRASCH.

REFERENCES CITED

The following references are of record in the file of this patent or the original patent:

UNITED STATES PATENTS

| Number | Name | Date |
|---|---|---|
| 924,284 | Smith | June 8, 1909 |
| 1,945,867 | Rawls | Feb. 6, 1934 |